United States Patent [19]

Glass et al.

[11] 4,156,740
[45] May 29, 1979

[54] SUGARLESS CENTER-FILLED CHEWING GUM

[75] Inventors: Michael Glass, Flushing; Wayne J. Puglia, Bellrose Village, both of N.Y.

[73] Assignee: Warner-Lambert Company, Morris Plains, N.J.

[21] Appl. No.: 874,717

[22] Filed: Feb. 2, 1978

[51] Int. Cl.$^2$ ............................................. A23G 3/30
[52] U.S. Cl. ...................................... 426/3; 426/103
[58] Field of Search ............................ 426/3, 5, 103

[56] References Cited

U.S. PATENT DOCUMENTS

| | | | |
|---|---|---|---|
| 810,210 | 1/1906 | Laws | 426/5 |
| 3,857,963 | 12/1973 | Graff et al. | 426/3 |
| 3,857,965 | 12/1974 | Ream | 426/3 |
| 3,894,154 | 7/1975 | Graff et al. | 426/5 |
| 3,930,026 | 12/1975 | Clark | 426/3 |
| 4,065,578 | 12/1977 | Reggio et al. | 426/3 |

Primary Examiner—Jeanette M. Hunter
Attorney, Agent, or Firm—George M. Kaplan; Albert H. Graddis; Frank S. Chow

[57] ABSTRACT

The disclosure relates to a sugarless center-filled gum wherein the sugarless chewing gum formulation can be extruded to form a hollow-centered rope and wherein the sugarless center-fill is not absorbed into the chewing gum. Both the chewing gum and the liquid fill have incorporated therein a composition comprising a natural or synthetic gum, glycerin humectant and an additional humectant which may be sorbitol solution or a combination of sorbitol solution and propylene glycol. Suitable synthetic or natural gums include carboxymethylcellulose, pectin, propylene glycol alginates, agar and gum tragacanth. The preferred composition which is incorporated into both the sugarless chewing gum formulation and the sugarless liquid fill contains sodium carboxymethylcellulose, glycerin and sorbitol solution.

12 Claims, No Drawings

SUGARLESS CENTER-FILLED CHEWING GUM

BACKGROUND OF THE INVENTION

1. Field of the Invention

The present invention relates to a sugarless center-filled gum wherein the sugarless gum composition can be extruded and wherein the sugarless liquid fill is not absorbed into the chewing gum shell.

2. Description of the Prior Art

Center-filled chewing gums are known in the art. For example, chewing gum pieces having a jam or cream fill are disclosed in Japanese Pat. No. 787,695; and U.S. Pat. No. 810,210 discloses filling the center of chewing gum with a jelly or fruit syrup.

U.S. Pat. No. 3,806,290 and U.S. Pat. No. 3,857,963 disclose a continuous method and apparatus for extruding chewing gum to form a hollow-centered rope of gum and forcing the center-fill into the cavity within the rope of gum. U.S. Pat. No. 3,894,154 teaches the inclusion of glycerin in the liquid fill of a center-filled gum to retard increases in viscosity.

Prior art methods and apparatus have been used successfully with sugar-containing chewing gums. However, extrusion of sugarless gums such as those disclosed in U.S. Pat. No. 3,352,689 has not been heretofore possible: it has been found that the sugarless chewing gum hardens and crumbles before extrusion can be completed; a uniform, hollow-centered rope of gum cannot be obtained. Furthermore, sugarless liquid fill is quickly absorbed by the prior art sugarless gum compositions.

SUMMARY OF THE INVENTION

The present invention provides a sugarless center-filled chewing gum wherein there is incorporated in both the sugarless gum formulation and the liquid fill formulation, a composition comprising natural or synthetic gum selected from the group consisting of carboxymethylcellulose, pectin, propylene glycol alginates, agar and gum tragacanth; glycerin humectant; and an additional water miscible humectant ingredient selected from the group consisting of sorbitol solution or a combination of sorbitol solution and propylene glycol.

DESCRIPTION OF THE SPECIFIC EMBODIMENTS

A sugarless center-filled chewing gum wherein the chewing gum formulation can be extruded to form a hollow-centered rope and wherein the sugarless center-fill is not absorbed into the chewing gum, can be obtained according to the present invention, by incorporating into both the sugarless chewing gum formulation and the center-fill a composition comprising a natural or synthetic gum, glycerin humectant and an additional water miscible humectant which may be sorbitol solution or a combination of sorbitol solution and propylene glycol. Typically, the composition of this invention is formulated as a pre-mix and added to both the sugarless gum formulation and the center-fill composition prior to actual formation of the center-filled gum.

Natural or synthetic gums suitable for use in the pre-mix composition of this invention include carboxymethylcellulose, pectin, propylene glycol alginate, agar and gum tragacanth.

These gums are known in the art and are commercially available. For example, propylene glycol alginates are esters of alginic acid sold commercially by Kelco Company, 20 North Wacker Drive, Chicago, Ill. A particularly preferred propylene glycol alginate is sold by the Kelco Company under the name Kelcoloid LVF.

Among the aforementioned gums, high viscosity carboxymethylcellulose gums, generally available as sodium carboxymethylcellulose are preferred. In particular, carboxymethylcellulose gums have a viscosity of from about 400 to about 4,500 centipoises at 1% concentration, 25° C., are suitable for use in the practice of this invention.

The natural or synthetic gum ingredient is used in the pre-mix composition of this invention in an amount of from about 0.4 to about 1 part by weight, preferably 0.5 parts by weight, based on the total weight of the pre-mix composition. In a particularly preferred embodiment of this invention, sodium carboxymethylcellulose having a viscosity of 1000–2800 at 1% concentration, 25° C., sold commercially as CMC 7H3SF by Hercules Incorporated, 380 Madison Avenue, New York, N.Y., is used in the pre-mix composition in an amount of about 0.5 parts by weight.

The glycerin humectant ingredient is present in the pre-mix composition in an amount of from about 50 parts by weight to about 84 parts by weight, preferably about 50 parts by weight, based on the total weight of the pre-mix composition.

The additional water miscible humectant is present in an amount of from about 15 to about 49.6 parts, preferably 49.5 parts by weight of the pre-mix composition. The sorbitol solution, which is the preferred additional humectant, is sorbitol solution USP, which contains not less than 69 grams and not more than 71 grams of total solids consisting essentially of sorbitol and a small amount of mannitol and other isometric polyhyrdric alcohols, in 100 grams of solution. If desired, a portion of the sorbitol solution humectant may be replaced with propylene glycol. Typically, such combinations include sorbitol solution and propylene glycol in ratios of from about 4:1 to about 1:1.

In a particularly preferred embodiment of this invention, the pre-mix composition comprises about 0.5 parts by weight of sodium carboxymethylcellulose, about 50 parts by weight glycerin humectant and about 49.5 parts by weight sorbitol solution.

The pre-mix of this invention is prepared by dissolving the carboxymethylcellulose in the glycerin humectant and then adding the sorbitol solution or sorbitol solution/propylene glycol combination thereto. The mixture is heated to about 50° C. whereupon heating is discontinued. Heating time varies depending on the type of cooking equipment employed. For example, in an atmospheric cooker, a temperature of about 50° C. is reached in about 10 to about 15 minutes. A moderately viscous liquid is obtained, suitable for incorporation into sugarless chewing gum and suitable for use as a center-fill in a liquid-center sugarless chewing gum.

The pre-mix composition of this invention may be incorporated into a sugarless chewing gum in an amount of from about 4 to about 10 parts, preferably about 5 parts by weight, based on the total weight of the gum formulation. Typically, the pre-mix composition is admixed with the chewing gum base and other ingredients in the formulation are added thereto. It has been found that sugarless gums containing the pre-mix composition of this invention is softer and has improved elasticity and stretch properties. It can be extruded to form a hollow-centered rope of gum which is suitable for further processing into center-filled chewing gum pieces. While the activity of the pre-mix composition is not totally understood, it has been found to provide, in addition to greatly improved extrusion properties, enhanced water retention characteristics. Thus, the extrudable sugarless chewing gum containing the pre-mix composition of this invention exhibits prolonged shelf life and greater stability.

The pre-mix composition of this invention may be added to a sugarless center-fill which is intended for use in a center-filled gum in an amount of at least about 98 parts by weight, preferably about 98.7 to about 99.95 parts by weight, based on the total weight of the center-fill. While the pre-mix composition may itself be used as a center-fill for chewing gum, other additives such as flavor, color and synthetic sweeteners are preferably added since they provide a product which has greater consumer acceptability. The sugarless pre-mix composition of this invention has been found to retard increases in viscosity and prevent absorption of the center-fill into the chewing gum. Thus, the pre-mix composition of this invention increases the shelf-life and stability of a sugarless center-filled gum product which is formulated to contain the pre-mix composition in both the gum formulation and the center-fill.

Sugarless center-filled chewing gum pieces in accordance with the present invention may be manufactured according to methods known in the art with some minor modifications. For example, the apparatus and method disclosed in U.S. Pat. Nos. 3,806,290 and U.S. Pat. No. 3,857,963 (which are incorporated herein by reference) may be utilized. Typically, a sugarless chewing gum formulated to contain the pre-mix composition of this invention is fed into a gum extruder and extruded through an orifice as a hollow-centered rope of chewing gum. A center-fill formulated to contain the pre-mix composition of this invention is fed, under pressure, through an inner conduit to the hollow-center of the rope downstream of the orifice and the center-filled rope of chewing gum is passed into a sizing unit where rollers decreaase the cross sectional dimenstion of the rope gum and form individual gum units.

The sugarless center-filled gum prepared according to the teachings of this invention contain from about 75 to about 90, preferably about 85 to about 90 parts by weight of chewing gum and from about 10 to about 25, preferably about 10 to about 15 parts by weight of center-fill, based on the total weight of a gum piece. In a particularly prepared embodiment of this invention, the sugarless center-filled gum contains about 87 parts by weight of chewing gum and about 13 parts by weight of center-fill.

In order to further illustrate this invention, the following examples are provided.

EXAMPLE 1
PRE-MIX COMPOSITION

Dissolve 0.5 grams of sodium carboxymethylcellulose in 50 grams of glycerin, add 49.5 grams of sorbitol solution USP and heat to 50° C., whereupon heating is discontinued.

EXAMPLE 2
PRE-MIX COMPOSITION

Dissolve 0.5 grams of sodium carboxymethylcellulose in 50 grams of glycerin, add 25 grams of sorbitol solution USP and 24.5 grams of propylene glycol and heat to 50° C., whereupon heating is discontinued.

EXAMPLE 3

A. Gum Formulation

| Ingredients | Parts by Weight |
| --- | --- |
| 1. Gum base | 18 gms |
| 2. Gum arabic solution (49% gum arabic powder/51% water) | 8 gms |
| 3. Pre-mix composition of Example 1 | 5 gms |
| 4. Mannitol | 16 gms |
| 5. Sorbitol | 38 gms |
| 6. Peppermint oil flavor | 2 gms |
| 7. Sodium saccharin solution (43% sodium saccharin/57% water) | 0.2 gms |

Mix 1,2,3 and 7 together for 4 minutes; add 4–6 and mix thoroughly.

B. Center Fill

| Ingredients | Parts by Weight |
| --- | --- |
| 1. Pre-mix composition of Example 1 | 12.85 gms |
| 2. Peppermint oil flavor | 0.12 gms |
| 3. Sodium saccharin solution (43% sodium saccharin/57% water) | 0.03 gms |

Add 2–3 to the pre-mix composition of Example 1 and mix thoroughly.

C. CENTER-FILLED GUM

The chewing gum formulation of A is fed into a gum extruder and extruded through an orifice as a hollow-centered rope of chewing gum. The center-fill is fed, under pressure, through an inner conduit to the hollow center of the rope downstream of the orifice; the center-filled rope of chewing gum is passed into a sizing unit where rollers decrease the cross-sectional dimension of the gum rope and form individual gum units wherein there is 87% by weight gum and 13% by weight center-fill.

EXAMPLE 4

A. Gum Formulation

| Ingredients | Parts by Weight |
| --- | --- |
| 1. Gum base | 18 gms |
| 2. Gum arabic solution (49% gum arabic powder/51% water) | 8 gms |
| 3. Pre-mix composition of Example 2 | 5 gms |
| 4. Mannitol | 16 gms |
| 5. Sorbitol | 38 gms |
| 6. Peppermint oil flavor | 2 gms |
| 7. Sodium saccharin solution (43% sodium saccharin/57% water) | 0.2 gms |

Mix 1,2,3, and 7 together for 4 minutes; add 4–6 and mix thoroughly.

B. Center Fill

| Ingredients | Parts by Weight |
| --- | --- |
| 1. Pre-mix composition of Example 2 | 12.85 gms |
| 2. Peppermint oil flavor | 0.12 gms |
| 3. Sodium saccharin solution (43% sodium saccharin/57% water) | 0.03 gms |

Add 2–3 to the pre-mix composition of Example 2 and mix thoroughly.

C. CENTER-FILLED GUM

Center-filled gum pieces are prepared using formulations A and B and following the procedure of Example 3.

EXAMPLE 5

A. Gum Formulation

| Ingredients | Parts by Weight |
| --- | --- |
| 1. Gum base | 18 gms |
| 2. Gum arabic solution (49% gum arabic powder/51% water) | 8 gms |
| 3. Pre-mix composition of Example 1 | 5 gms |
| 4. Mannitol | 15 gms |
| 5. Sorbitol | 38 gms |
| 6. Spearmint oil flavor | 2 gms |
| 7. Color | 0.2 gms |
| Mix 1,2 and 3 for 4 minutes; add 4–7 and mix thoroughly. | |

B. Center Fill

| Ingredients | Parts by Weight |
| --- | --- |
| 1. Pre-mix composition of Example 1 | 12.78 gms |
| 2. Spearmint oil flavor | 0.12 gms |
| 3. Color | 0.10 gms |
| Add 2–3 to the pre-mix composition of Example 1 and mix thoroughly. | |

C. CENTER-FILLED GUM

Center-filled gum pieces are prepared using formulations A and B and following the procedure of Example 3.

EXAMPLE 6

A. Gum Formulation

| Ingredients | Parts by Weight |
| --- | --- |
| 1. Gum base | 18 gms |
| 2. Gum arabic solution (49% gum arabic powder/51% water) | 8 gms |
| 3. Pre-mix composition of Example 2 | 5 gms |
| 4. Mannitol | 15 gms |
| 5. Sorbitol | 38 gms |
| 6. Fruit flavor | 2 gms |
| 7. Color | 0.2 gms |
| Mix 1,2 and 3 for 4 minutes; add 4–7 and mix thoroughly. | |

B. Center Fill

| Ingredients | Parts by Weight |
| --- | --- |
| 1. Pre-mix composition of Example 2 | 12.78 gms |
| 2. Fruit flavor | 0.12 gms |
| 3. Color | 0.10 gms |
| Add 2–3 to the pre-mix composition of Example 2 and mix thoroughly. | |

C. CENTER-FILLED GUM

Center-filled gum pieces are prepared using formulations A and B and following the procedure of Example 3.

EXAMPLE 7

A. Gum Formulation

| Ingredients | Parts by Weight |
| --- | --- |
| 1. Gum base | 18 gms |
| 2. Gum arabic solution (49% gum arabic powder/51% water) | 8 gms |
| 3. Pre-mix composition of Example 1 | 5 gms |
| 4. Mannitol | 15 gms |
| 5. Sorbitol | 38 gms |
| 6. Spearmint oil flavor | 2 gms |
| Mix 1, 2 and 3 for 4 minutes; add 4–6 and mix thoroughly. | |

B. Center Fill

| Ingredients | Parts by Weight |
| --- | --- |
| 1. Pre-mix composition of Example 1 | 12.88 gms |
| 2. Spearmint oil flavor | 0.12 gms |
| Add the spearmint oil to the pre-mix composition of Example 1 and mix thoroughly. | |

C. CENTER-FILLED GUM

Center-filled gum pieces are prepared using formulations A and B and following the procedure of Example 3.

EXAMPLE 8

A. Gum Formulation

| Ingredients | Parts by Weight |
| --- | --- |
| 1. Gum base | 18 gms |
| 2. Gum arabic solution (49% gum arabic powder/51% water) | 8 gms |
| 3. Pre-mix composition of Example 2 | 5 gms |
| 4. Mannitol | 15 gms |
| 5. Sorbitol | 39 gms |
| 6. Peppermint oil flavor | 2 gms |
| Mix 1, 2 and 3 for 4 minutes; add 4–6 and mix thoroughly. | |

B. Center Fill

| Ingredients | Parts by Weight |
| --- | --- |
| 1. Pre-mix composition of Example 2 | 12.88 gms |
| 2. Peppermint oil flavor | 0.12 gms |
| Add the peppermint oil to the pre-mix composition of Example 2 and mix thoroughly. | |

C. CENTER-FILLED GUM

Center-filled gum pieces are prepared using formulations A and B and following the procedure of Example 3.

EXAMPLE 9

A. Gum Formulation

| Ingredients | Parts by Weight |
| --- | --- |
| 1. Gum base | 18 gms |
| 2. Gum arabic solution (49% gum arabic powder/51% water) | 8 gms |
| 3. Pre-mix composition of Example 1 | 5 gms |
| 4. Mannitol | 16 gms |
| 5. Sorbitol | 40 gms |
| Mix 1, 2 and 3 for 4 minutes; add ingredients 4 and 5 and mix thoroughly. | |

B. Center Fill

| Ingredients | Parts by Weight |
| --- | --- |
| 1. Pre-mix composition of Example 1 | 13 gms |

C. CENTER-FILLED GUM

Center-filled gum pieces are prepared using formulations A and B and following the procedure of Example 3.

We claim:

1. A sugarless center-filled chewing gum having an outer chewing gum shell enclosing a cavity and a sugarless liquid fill within said cavity; and having incorporated in both the chewing gum shell and the liquid fill a composition comprising:
   A. from about 0.4 to about 1 parts by weight of a natural or synthetic gum selected from the group consisting of carboxymethylcellulose, pectin, propylene glycol alginates, agar and gum tragacanth;
   B. from about 50 to about 84 parts by weight of a glycerin humectant and
   C. from about 15 to about 49.6 parts by weight of an additional water-miscible humectant ingredient selected from the group consisting of (1) sorbitol solution; or (2) sorbitol solution and propylene glycol.

2. A sugarless center-filled chewing gum according to claim 1 wherein the composition incorporated in both the chewing gum shell and the liquid fill comprises about from 0.4 to about 1 part by weight of carboxymethylcellulose, from about 50 to about 84 parts by weight of glycerin and from about 15 to about 49.6 parts by weight of sorbitol solution.

3. A sugarless center-filled chewing gum according to claim 1 wherein the composition incorporated in both the chewing gum shell and the liquid fill comprises about 0.5 parts by weight of sodium carboxymethylcellulose, about 50 parts by weight of glycerin and about 49.5 parts by weight of sorbitol solution.

4. A sugarless center-filled chewing gum according to claim 1 wherein the composition is incorporated into the chewing gum shell in an amount of from about 4 to about 10 parts by weight; and wherein the composition is incorporated into the liquid fill in an amount of at least 98.5 parts by weight.

5. A sugarless liquid fill for center-filled chewing gum, said liquid fill having incorporated therein a composition comprising:
   A. from about 0.4 to about 1 part by weight of a natural or synthetic gum selected from the group consisting of carboxymethylcellulose, pectin, propylene glycol alginates, agar and gum tragacanth;
   B. from about 50 to about 84 parts by weight of a glycerin humectant; and
   C. from about 15 to about 49.6 parts by weight of an additional water miscible humectant ingredient selected from the group consisting of (1) sorbitol solution; or (2) sorbitol solution and propylene glycol.

6. A sugarless liquid fill according to claim 5 wherein the composition comprises from about 0.4 to about 1 part by weight of carboxymethylcellulose, from about 50 to about 84 parts by weight of glycerin and from about 15 to about 49.6 parts by weight of sorbitol solution.

7. A sugarless liquid fill according to claim 5 wherein the composition comprises about 0.5 parts by weight of sodium carboxymethylcellulose, about 50 parts by weight of glycerin and about 49.5 parts by weight of sorbitol solution.

8. A sugarless liquid fill according to claim 5 wherein the composition is present in an amount of at least 98.5 parts by weight.

9. A process for preparing a sugarless center-filled chewing gum having an outer chewing gum shell enclosing a cavity and a sugarless liquid fill within said cavity which comprises incorporating into both the chewing gum shell and the liquid center-fill a composition comprising:
   A. from about 0.4 to about 1 part by weight of a natural or synthetic gum selected from the group consisting of carboxymethylcellulose, pectin, propylene glycol alginates, agar and gum tragacanth;
   B. from about 50 to about 84 parts by weight of a glycerin humectant; and
   C. from about 15 to about 49.6 parts by weight of an additional water-miscible humectant ingredient selected from the group consisting of (1) sorbitol solution; or (2) sorbitol solution and propylene glycol;

whereby said sugarless gum is extrudable and whereby the said sugarless liquid fill resists absorption into the chewing gum shell.

10. A process according to claim 9 wherein the composition comprises from about 0.4 to about 1 part by weight of carboxymethylcellulose, from about 50 to 84 parts by weight of glycerin and from about 15 to about 49.6 parts by weight of sorbitol solution.

11. A process according to claim 9 wherein the composition comprises about 0.5 parts by weight of sodium carboxymethylcellulose, about 50 parts by weight of glycerin and about 49.5 parts by weight of sorbitol solution.

12. A process according to claim 9 wherein the composition is incorporated into the chewing gum shell in an amount of from about 4 to about 10 parts by weight; and wherein the composition is incorporated into the liquid fill in an amount of at least 98.5 parts by weight.

* * * * *